(12) United States Patent
Chandrasekaran et al.

(10) Patent No.: US 10,467,023 B2
(45) Date of Patent: Nov. 5, 2019

(54) SYSTEM AND METHOD OF INTERACTIVE SPLASH SCREEN IN EMBEDDED ENVIRONMENTS

(71) Applicant: AMZETTA TECHNOLOGIES, LLC, Norcross, GA (US)

(72) Inventors: Balasubramanian Chandrasekaran, Chennai (IN); David Yoon, Atlanta, GA (US); Yugender P. Subramanian, Norcross, GA (US); Manikandan Ganesan Malliga, Dindigul (IN)

(73) Assignee: AMZETTA TECHNOLOGIES, LLC, Norcross, GA (US)

( * ) Notice: Subject to any disclaimer, the term of this patent is extended or adjusted under 35 U.S.C. 154(b) by 33 days.

(21) Appl. No.: 15/491,134

(22) Filed: Apr. 19, 2017

(65) Prior Publication Data

US 2018/0307497 A1     Oct. 25, 2018

(51) Int. Cl.
*G06F 9/445* (2018.01)
*G06F 9/4401* (2018.01)
*G06F 9/455* (2018.01)

(52) U.S. Cl.
CPC ........ *G06F 9/44505* (2013.01); *G06F 9/4401* (2013.01); *G06F 9/45512* (2013.01)

(58) Field of Classification Search
CPC .. G06F 9/4403; G06F 9/44505; G06F 3/0482; G06F 9/45512; G06F 9/4401
See application file for complete search history.

(56) References Cited

U.S. PATENT DOCUMENTS

| | | | | |
|---|---|---|---|---|
| 5,790,120 A | * | 8/1998 | Lozares | G06F 9/45512 715/779 |
| 2005/0022165 A1 | * | 1/2005 | Ruff | G06F 9/4403 717/121 |
| 2006/0161889 A1 | * | 7/2006 | Stabb | G06F 3/0482 717/113 |

\* cited by examiner

*Primary Examiner* — Terrel S Johnson
(74) *Attorney, Agent, or Firm* — Locke Lord LLP; Tim Tingkang Xia, Esq.

(57) ABSTRACT

An embedded system includes a processor, a volatile memory coupled to the processor, and a non-volatile memory storing a computer executable code. The computer executable code, when executed by the at least one processor, is configured to: perform a boot process; display a splash screen during the boot process; and during the display of the splash screen: provide a plurality of interactive links between executing a plurality of applications and a plurality of inputs; receive one of the inputs from a user; and in response to receiving the one of the inputs, execute the corresponding application based on the interactive links after accomplishing the boot process.

20 Claims, 3 Drawing Sheets

SYSTEM AND METHOD OF INTERACTIVE SPLASH SCREEN IN EMBEDDED ENVIRONMENTS

FIELD

The present disclosure relates generally to an embedded system, and more particularly to systems and methods of providing an interactive splash screen during boot process of the embedded system.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

In an embedded system, there are typically constraints on hardware resources thereby limiting processing capabilities. This limits the speed in which the system is able to load all the necessary software components to become useable. In particular, embedded systems with a graphical user interface (GUI) will take an inordinate amount of time as GUIs are typically resource intensive.

Therefore, an unaddressed need exists in the art to address the aforementioned deficiencies and inadequacies.

SUMMARY

In one aspect, the disclosure is directed to an embedded system. In certain embodiments, the embedded system includes a processor and a non-volatile memory storing a computer executable code. The computer executable code, when executed at the processor, is configured to:

perform a boot process;
display a splash screen during the boot process; and
during the display of the splash screen:
provide a plurality of interactive links (function/correspondence) between executing a plurality of applications and a plurality of inputs;
receive one of the inputs from a user; and
in response to receiving the one of the inputs, execute the corresponding application based on the interactive links after accomplishing the boot process.

In certain embodiments, the splash screen is displayed using a plurality of images displayed sequentially on a monitor in a pre-determined time interval, each of the images comprises a background portion and an area of change, the back ground portions of the images are the same, and the area of change of the images are different from each other. In certain embodiments, the computer executable code, when executed, is further configured to provide a timer for count the pre-determined time interval. In certain embodiments, the area of change of each image is much smaller than the background portion of that image.

In certain embodiments, the splash screen comprises a boot status indicator to show a progress of the boot process. In certain embodiments, the boot status indicator is located in the area of change of each of the images. In certain embodiments, the splash screen comprises a boot logo to indicate that the embedded system is in the boot process.

In certain embodiments, the inputs is inputted using a hotkey. In certain embodiments, the hotkey comprises function keys, system keys, application keys, numerical keys, and cursor control keys.

In certain embodiments, when the instruction of the user is not received, the computer executable code, when executed, is configured to launch a graphic user interface after accomplishing the boot process.

In another aspect, the present disclosure relates to a method of providing an interactive splash screen in an embedded system during a boot process of the embedded system. The method includes:

performing, at a processor of the embedded system, a boot process;
displaying a splash screen during the boot process; and
during the display of the splash screen:
providing a plurality of interactive links between executing a plurality of applications and a plurality of inputs;
receiving one of the inputs from a user; and
in response to receiving the one of the inputs, executing the corresponding application based on the interactive links after accomplishing the boot process.

In certain embodiments, the splash screen is displayed using a plurality of images displayed sequentially on a monitor in a pre-determined time interval, each of the images comprises a background portion and an area of change, the back ground portions of the images are the same, and the area of change of the images are different from each other. In certain embodiments, the computer executable code, when executed, is further configured to provide a timer for count the pre-determined time interval. In certain embodiments, the area of change of each image is much smaller than the background portion of that image.

In certain embodiments, the splash screen comprises a boot status indicator to show a progress of the boot process. In certain embodiments, the boot status indicator is located in the area of change of each of the images. In certain embodiments, the splash screen comprises a boot logo to indicate that the embedded system is in the boot process.

In certain embodiments, the inputs is inputted using a hotkey. In certain embodiments, the hotkey comprises function keys, system keys, application keys, numerical keys, and cursor control keys.

In certain embodiments, when the instruction of the user is not received, the computer executable code, when executed, is configured to launch a graphic user interface after accomplishing the boot process.

In a further aspect, the present disclosure relates to a non-transitory computer readable medium storing computer executable code. The computer executable code, when executed at a processor of an embedded system, is configured to:

perform a boot process;
display a splash screen during the boot process;
during the display of the splash screen:
provide a plurality of interactive links (function/correspondence) between executing a plurality of applications and a plurality of inputs;
receive one of the inputs from a user; and
in response to receiving the one of the inputs, execute the corresponding application based on the interactive links after accomplishing the boot process.

In certain embodiments, the splash screen is displayed using a plurality of images displayed sequentially on a monitor in a pre-determined time interval, each of the images comprises a background portion and an area of change, the back ground portions of the images are the same, and the area of change of the images are different from each other. In certain embodiments, the computer executable code, when executed, is further configured to provide a timer for count the pre-determined time interval. In certain embodiments, the area of change of each image is much smaller than the background portion of that image.

In certain embodiments, the splash screen comprises a boot status indicator to show a progress of the boot process. In certain embodiments, the boot status indicator is located in the area of change of each of the images. In certain embodiments, the splash screen comprises a boot logo to indicate that the embedded system is in the boot process.

In certain embodiments, the inputs is inputted using a hotkey. In certain embodiments, the hotkey comprises function keys, system keys, application keys, numerical keys, and cursor control keys.

In certain embodiments, when the instruction of the user is not received, the computer executable code, when executed, is configured to launch a graphic user interface after accomplishing the boot process.

These and other aspects of the present disclosure will become apparent from the following description of the preferred embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the detailed description and the accompanying drawings, wherein.

DETAILED DESCRIPTION

Figure 1:
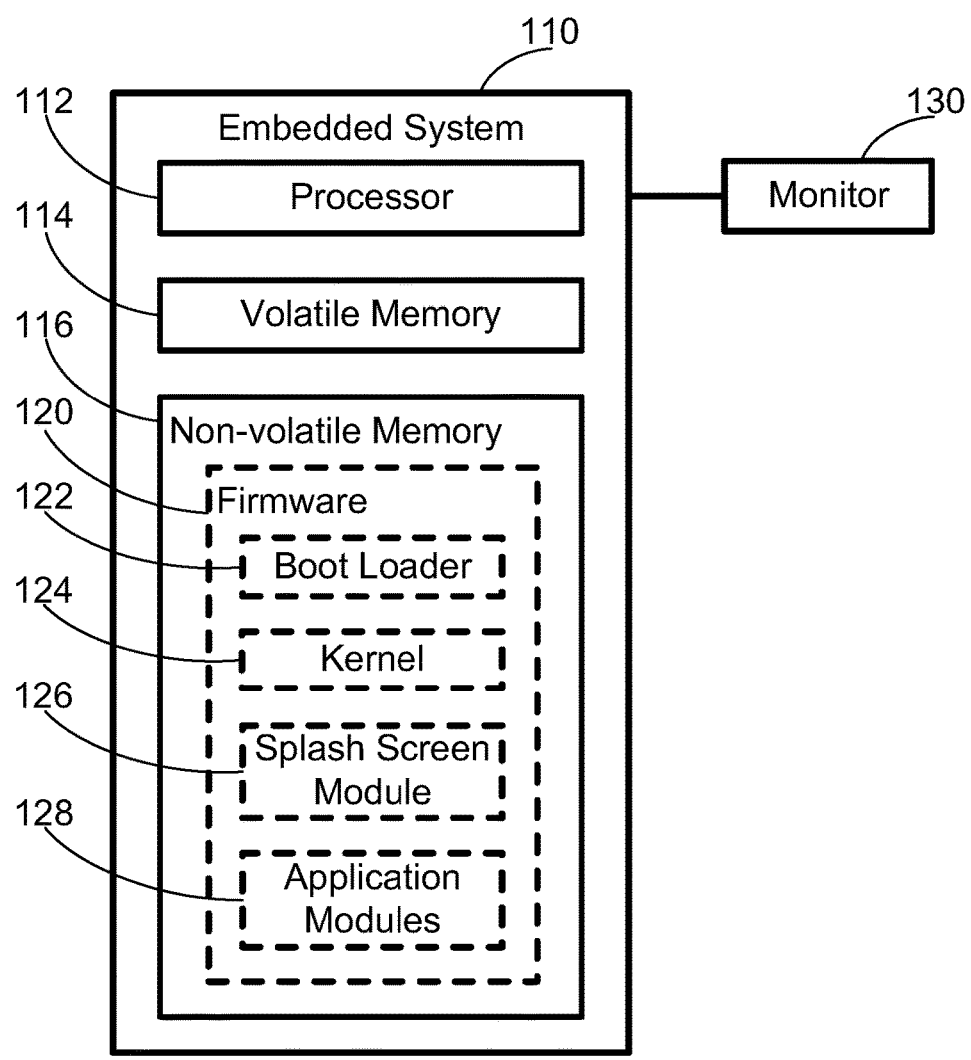
FIG. 1 schematically depicts a system according to certain embodiments of the present disclosure.

The present disclosure is more particularly described in the following examples that are intended as illustrative only since numerous modifications and variations therein will be apparent to those skilled in the art. Various embodiments of the disclosure are now described in detail. Referring to the drawings, like numbers, if any, indicate like components throughout the views. As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise. Moreover, titles or subtitles may be used in the specification for the convenience of a reader, which shall have no influence on the scope of the present disclosure. Additionally, some terms used in this specification are more specifically defined below.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and in no way limits the scope and meaning of the disclosure or of any exemplified term. Likewise, the disclosure is not limited to various embodiments given in this specification.

Unless otherwise defined, all technical and scientific terms used herein have the same meaning as commonly understood by one of ordinary skill in the art to which this disclosure pertains. In the case of conflict, the present document, including definitions will control.

As used herein, "around", "about" or "approximately" shall generally mean within 20 percent, preferably within 10 percent, and more preferably within 5 percent of a given value or range. Numerical quantities given herein are approximate, meaning that the term "around", "about" or "approximately" can be inferred if not expressly stated.

As used herein, "plurality" means two or more.

As used herein, the terms "comprising," "including," "carrying," "having," "containing," "involving," and the like are to be understood to be open-ended, i.e., to mean including but not limited to.

As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

As used herein, the term "module" may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The term "code", as used herein, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The term "interface", as used herein, generally refers to a communication tool or means at a point of interaction between components for performing data communication between the components. Generally, an interface may be applicable at the level of both hardware and software, and may be uni-directional or bi-directional interface. Examples of physical hardware interface may include electrical connectors, buses, ports, cables, terminals, and other I/O devices or components. The components in communication with the interface may be, for example, multiple components or peripheral devices of a computer system.

The term "function key," as used herein, generally refers to a key on a computer or terminal keyboard which can be programmed so as to cause an operating system command interpreter or application program to perform certain actions, a form of soft key. On some keyboards/computers, function keys may have default actions, accessible on power-on.

The term "embedded system," as used herein, generally refers to a computer system with a dedicated function within a larger mechanical or electrical system, often with real-time computing constraints. It is embedded as part of a complete device often including hardware and mechanical parts. Embedded systems control many devices in common use today. Ninety-eight percent of all microprocessors are manufactured as components of embedded systems. Examples of properties of typically embedded computers when compared with general-purpose counterparts are low power consumption, small size, rugged operating ranges, and low per-unit cost. This comes at the price of limited processing resources, which make them significantly more difficult to program and to interact with.

The term "splash screen," as used herein, generally refers to a graphical control element consisting of window containing an image, a logo and the current version of the software. A splash screen usually appears while a game or program is launching. A splash page is an introduction page on a website. Splash screens cover the entire screen or web page, or simply a rectangle near the center of the screen or page. The splash screens of operating systems and some applications that expect to be run full-screen usually cover the entire screen.

The present disclosure relates to computer systems. As depicted in the drawings, computer components may include physical hardware components, which are shown as solid line blocks, and virtual software components, which are shown as dashed line blocks. One of ordinary skill in the art would appreciate that, unless otherwise indicated, these computer components may be implemented in, but not limited to, the forms of software, firmware or hardware components, or a combination thereof.

The apparatuses, systems and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

In one aspect, the present disclosure is directed to an embedded system that provides an interactive dynamic splash screen. The splash screen is a lightweight output to help mediate the downtime the user has to face during boot. In certain embodiments, by allowing the splash screen to be moderately interactive, the user is allowed to make some decisions and reduce the wait time (e.g. choosing to go to a particular user interface (UI) page or activity).

FIG. 1 schematically depicts a system according to certain embodiments of the present disclosure. As shown in FIG. 1, the system 100 includes an embedded system 110 and a monitor 130 in communication with the embedded system 110.

In certain embodiments, the embedded system 110 is a baseboard management controller (BMC), which is a specialized microcontroller that manages the interface between system management software and platform hardware. In certain embodiments, the embedded system 110 may be a service processor (SP). Different types of sensors can be built into a computing device, and the BMC 110 reads these sensors to obtain parameters such as temperature, cooling fan speeds, power status, OS status, etc. The embedded system 110 may also range from portable devices such as digital watches and MPEG-1 and/or MPEG-2 Audio Layer III (MP3) players, to large stationary installations like traffic lights, factory controllers, and largely complex systems like hybrid vehicles, magnetic resonance imaging (MRI), and avionics.

As shown in FIG. 1, the embedded system 110 includes a processor 112, a volatile memory 114 and a non-volatile memory 116. In certain embodiments, one or more remote computing devices may be connected to the embedded device 110 via a network. In certain embodiments, the embedded system 110 may include other components, such as at least one I/O device (not shown).

The processor 112 controls operation of the embedded system 110. The processor 112 may execute the firmware 120 or other codes stored in the embedded system 110. In certain embodiments, the embedded system 110 may run on or more than one processor.

The volatile memory 114 may be a random-access memory (RAM), which is configured to store the data and information during the operation of the embedded system 110. When the embedded system 110 restarts, the contents stored in the volatile memory 114 will be lost.

The non-volatile memory 116 is a non-volatile data storage media for storing computer executable code and data required for the operation of the embedded system 110, such as a firmware 120 and any other necessary software or firmware components of the embedded system 110. Examples of the non-volatile memory 116 may include flash memory, memory cards, USB drives, hard drives, floppy disks, optical drives, or any other types of data storage devices. In certain embodiments, the firmware 120 includes, among other things, a boot loader 122, a kernel 124, a splash screen module 126, and application modules 128.

The boot loader 122 is a computer program that loads an operating system, such as the kernel 124 for the embedded system 110 after power on. Specifically, when the embedded system 110 is powered-up or restarted, the basic input/output (BIOS) performs some initial tests, and then transfers control to the master boot record (MBR) where the boot loader 122 resides. The boot loader 122 is loaded into the volatile memory 114 from the non-volatile memory 116, and the boot loader 122 then loads and executes the processes that finalize the boot, including brings the kernel 124 into the volatile memory 114, providing the kernel 124 with the information it needs to work correctly, switching to an environment that the kernel will like, and transferring control to the kernel 124.

The kernel 124 is the operating system, such as a Linux kernel of the embedded system 110. The kernel 124 manages input/output (I/O) requests from software, and translates them into data processing instructions for the processor 112 and other electronic components of the embedded system 110. The primary function of the kernel 124 is to mediate access to the embedded system 110's resources, including the processor 112, the volatile memory 114, and I/O devices.

The splash screen module 126 is launchable by the kernel 124 during the boot process. The splash screen module 126, when being executed, is configured to display or show a splash screen 200 in the monitor 130.

Figure 2:
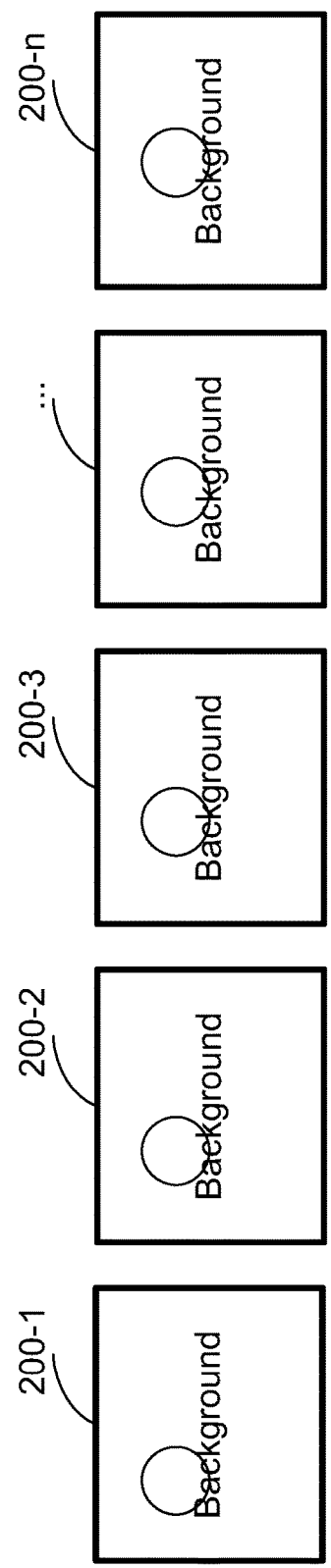
FIG. 2 schematically shows images for a splash screen according to one embodiment of the present disclosure.

As shown in FIG. 2, the splash screen 200 may include an array of images 200-1, 200-2, 200-3, . . . , and 200-n. The images 200-1 to 200-n are sequentially displayed on the monitor 130 to give an illusion of motion. In certain embodiments, the splash screen module 126 further includes a timer. The timer counts the time, so as to show the array of images 200 sequentially in a pre-determined time interval. The pre-determined time interval can be, for example, 1 second, 5 seconds, 10 seconds, etc., but is not limited thereto. In certain embodiments, the pre-determined time interval relates to the boot process of the embedded system 110. As shown in FIG. 2, each image of the splash screen 200 may have the same background information, and only a small difference exists in neighboring images. In FIG. 2, a circle in each of the images represents a focal area of change. For example, a small 2×2 square with a center at (X, Y) coordinate may be defined as the area of change in image 200-1. In the next image 200-2, the area of change moves 2 pixel (or 2 mm, or 2 cm, or any other suitable unit) toward the right direction, and the area of change in image 200-2 has a center at (X+2, Y). Subsequently, the center of the area of changes in image 200-3 and image 200-n are at the coordinates of (X+4, Y) and (X+2n−2, Y), respectively. By this type of design, it is not necessary for storing information for each of the images. Instead, a background information common to all the images, and a delta information corresponding to the area of change of each image are sufficient to restore all the images. By this type of design, the information needed for displaying the splash screen can be limited to a small size.

In certain embodiments, the splash screen module 126, when being executed, is configured to monitor the boot progress, and display the boot process on the splash screen 200. In certain embodiments, the progress of the boot process is shown in the area of change as a boot status indicator. The boot status indicator may be shown in the splash screen as a percentage bar, where the percentage from 0-100% shows roughly the percentage of the boot process that is accomplished. In certain embodiments, the boot status indicator is shown in the area of change of each image.

In certain embodiments, the splash screen module 126, when being executed, is configured to provide interaction with a user during the boot process. In certain embodiments, the interaction is performed by using pre-defined hotkeys. The hotkeys may include function keys, system keys, application keys, numerical keys and cursor control keys of a keyboard. For example, the function key "F2" may be defined as "Launch Diagnostic Tools," the function key "F12" may be defined as "Config/Setup," the function key "Esc" may be defined as "Cancel Automatic Remote Desktop Protocol (RDP) Connection." Once at least one of the above function key is selected by the user during the boot process, the splash module 126 receives the instruction and forwards the instruction to the kernel 124. In response to the forwarded instruction, the kernel 124, when finished the boot process, execute an application corresponding to the received instruction. In one example, the instruction corresponds to application modules 128, and the kernel 124 launches the application modules 128 after finishing the boot process. In certain embodiments, the user may not make any selection during the boot process. Then by default or in response to the inaction of the user, the kernel 124 may launch a graphic user interface (GUI).

The application modules 128 include codes of one or more applications that can be launched after the boot process. When those application modules 128 are launched by selection of the user using the GUI after the boot process, it takes some time. In contrast, if the user selects to launch those application modules 128 during the boot process, the kernel can be used to launch those application modules 128 immediately after the boot process. Thus, the kernel 124 does not need to wait for further instructions from the user after the boot process. By this type of design, user inputs are available during the boot process, and time is saved for instructing launching of those application modules 128. In certain embodiments, the application modules 128 are part of the embedded system 110. In other embodiments, one or more of the application modules 128 may also reside in other devices in communication with the embedded system 110.

Figure 3:
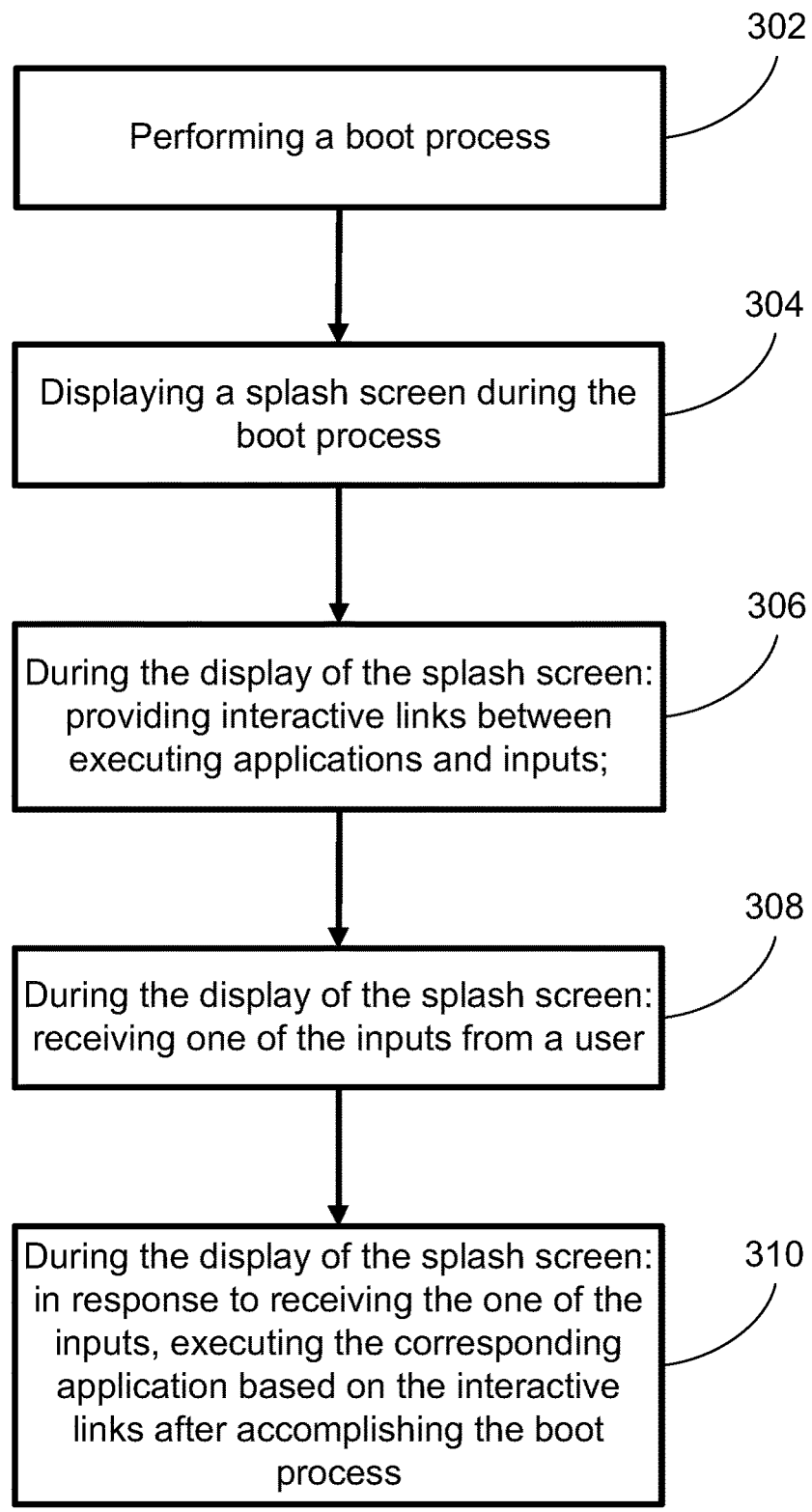
FIG. 3 schematically depicts a method of providing an interactive splash screen according to certain embodiments of the present disclosure.

FIG. 3 schematically depicts a method of providing an interactive splash screen in an embedded system. The system may have the same structure as described above in FIG. 1. The embedded system 110 may be a service processor, and the service processor may be a BMC. The service processor may manage a host (e.g., a host computer) and is connected to a display or a monitor.

As shown in FIG. 3, after the embedded system 110 is powered on, at operation 302, the embedded system 110 performs a boot process. Specifically, the boot loader 122 is executed at the processor 112. The boot loader 122, when being executed, loads the kernel 124. The kernel 124, when being executed, loads and executes the splash screen module 126. At the same time or after executing the splash screen module 126, the kernel 124 loads other related modules to continue the boot process.

In certain embodiments, the execution of the kernel 124 for booting and the execution of the splash screen module 126 are performed in parallel.

At operation 304, the splash screen module 126 is executed at the processor 112, and the execution of the splash screen module 126 provides a splash screen to the monitor 130. Referring back to FIG. 2, the splash screen shown in the monitor 130 may be formed by the images 200-1 to 200-n. The images 200-1 to 200-n may be shown in the monitor 130 in a pre-determined time interval. Each of the images, for example image 200-1, includes a background and an area of change that is represented by the circle. The backgrounds for each of the images 200-1 to 200-n are the same, and the areas of change of the images 200-1 to 200-n are different from each other. The time for showing of the images 200-1 to 200-n may correspond to the time required for the boot process. In certain embodiments, the boot processes at different times may be different from each other, and the pre-determined time for showing the splash images 200-1 to 200-n may also change correspondingly, such that the showing of the splash images corresponds to the specific time required for that boot process.

During the display of the splash screen in the monitor 130, at operation 306, the splash screen provides a plurality of interactive links between executing a plurality of applications and a plurality of inputs. The inputs may be hotkeys that a user can select from. The applications may be provided by executing the application modules 128, and the application is determined to be executed after accomplishing the boot process. Each of the inputs corresponds to one of the applications. For example, the function key "F2" may be entered by the user to indicate "Launch Diagnostic Tools," the function key "F12" may be entered by the user to indicate "Config/Setup," the function key "Esc" may be entered by the user to indicate "Cancel Automatic RDP Connection."

At operation 308, during the display of the splash screen, the embedded system 110 receives an input from the user. In certain embodiments, the user is only allowed to make one input, and the one input correspond to on application that will be executed after the boot process. In other embodiments, the user may sequentially make several inputs, and the corresponding several applications will be executed in parallel after the boot process. In a further embodiment, when the user does not make any inputs during the boot process, the kernel launch a GUI as a default.

When the user make the input by select the hotkey, the input is received and forwarded to, for example, to the kernel 124 that is running for the boot process.

In response to receiving the one of the inputs, at operation 310, the kernel execute the corresponding application based on the interactive links after accomplishing the boot process.

In a further aspect, the present disclosure is related to a non-transitory computer readable medium storing computer executable code. The code, when executed at one or more processor of an embedded system 110, may perform the method as described above. In certain embodiments, the non-transitory computer readable medium may include, but not limited to, any physical or virtual storage media. In certain embodiments, the non-transitory computer readable medium may be implemented as the non-volatile memory 116 of the embedded system 110 as shown in FIG. 1.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope. Accordingly, the scope of the present disclosure is defined by the appended claims rather than the foregoing description and the exemplary embodiments described therein.

What is claimed is:

1. An embedded system, comprising:
   a processor; and
   a non-volatile memory storing a computer executable code, wherein the computer executable code, when executed at the processor, is configured to:
   perform a boot process;
   display a splash screen during the boot process; and
   during the display of the splash screen:
      provide a plurality of interactive links between executing a plurality of applications and a plurality of inputs, wherein each of the inputs corresponds to one of the applications;
      receive one of the inputs from a user during the boot process; and
      in response to receiving the one of the inputs during the boot process, execute the corresponding application based on the interactive links after accomplishing the boot process.

2. The embedded system of claim 1, wherein the splash screen is displayed using a plurality of images displayed sequentially on a monitor in a pre-determined time interval, each of the images comprises a background portion and an area of change, the back ground portions of the images are the same, and the area of change of the images are different from each other.

3. The embedded system of claim 2, wherein the computer executable code, when executed, is further configured to provide a timer for count the pre-determined time interval.

4. The embedded system of claim 2, wherein the area of change of each image is smaller than the background portion of that image.

5. The embedded system of claim 1, wherein the splash screen comprises a boot status indicator to show a progress of the boot process.

6. The embedded system of claim 5, wherein the boot status indicator is located in the area of change of each of the images.

7. The embedded system of claim 5, wherein the splash screen comprises a boot logo to indicate that the embedded system is in the boot process.

8. The embedded system of claim 1, wherein the inputs are inputted using a hotkey.

9. The embedded system of claim 1, wherein the hotkey comprises function keys, system keys, application keys, numerical keys, and cursor control keys.

10. The embedded system of claim 1, wherein when the one of the inputs is not received from the user during the boot process, the computer executable code, when executed, is configured to launch a graphic user interface after accomplishing the boot process.

11. A method of providing an interactive splash screen in an embedded system during a boot process of the embedded system, comprising:
   performing, at a processor of the embedded system, a boot process;
   displaying a splash screen during the boot process; and
   during the display of the splash screen:
      providing a plurality of interactive links between executing a plurality of applications and a plurality of inputs, wherein each of the inputs corresponds to one of the applications;
      receiving one of the inputs from a user; and
      in response to receiving the one of the inputs, executing the corresponding application based on the interactive links after accomplishing the boot process.

12. The method of claim 11, wherein the splash screen is displayed using a plurality of images displayed sequentially on a monitor in a pre-determined time interval, each of the images comprises a background portion and an area of change, the back ground portions of the images are the same, and the area of change of the images are different from each other.

13. The method of claim 12, wherein the area of change of each image is smaller than the background portion of that image.

14. The method of claim 12, wherein the splash screen comprises a boot status indicator in the area of change of each of the images to show a progress of the boot process.

15. The method of claim 11, wherein the inputs are inputted using a hotkey comprising function keys, system keys, application keys, numerical keys, and cursor control keys.

16. The method of claim 11, wherein when the one of the inputs is not received from the user during the boot process, the computer executable code, when executed, is configured to launch a graphic user interface after accomplishing the boot process.

17. A non-transitory computer readable medium storing computer executable code, wherein the computer executable code, when executed at a processor of an embedded system, is configured to:
   perform a boot process;
   display a splash screen during the boot process; and
   during the display of the splash screen:

provide a plurality of interactive links between executing a plurality of applications and a plurality of inputs, wherein each of the inputs corresponds to one of the applications;

receive one of the inputs from a user; and in response to receiving the one of the inputs, execute the corresponding application based on the interactive links after accomplishing the boot process.

18. The non-transitory computer readable medium of claim 17, wherein the splash screen is displayed using a plurality of images displayed sequentially on a monitor in a pre-determined time interval, each of the images comprises a background portion and an area of change, the back ground portions of the images are the same, and the area of change of the images are different from each other.

19. The non-transitory computer readable medium of claim 18, wherein the area of change of each image is smaller than the background portion of that image.

20. The non-transitory computer readable medium of claim 17, wherein the splash screen comprises a boot status indicator in the area of change of each of the images to show a progress of the boot process; and wherein the inputs are inputted using a hotkey comprising function keys, system keys, application keys, numerical keys, and cursor control keys.

* * * * *